United States Patent
Caldwell et al.

[11] Patent Number: 5,394,496
[45] Date of Patent: Feb. 28, 1995

[54] OPTICAL FIBER MECHANICAL SPLICE

[75] Inventors: Kevin G. Caldwell, Calgary; Guy Castonguay; Russell M. Modien, both of Saskatoon, all of Canada

[73] Assignee: Northern Telecom Limited, Montreal, Canada

[21] Appl. No.: 163,642

[22] Filed: Dec. 9, 1993

[51] Int. Cl.$^6$ .................. G02B 6/255; G02B 6/38
[52] U.S. Cl. ........................... 385/70; 385/53; 385/75; 385/76; 385/97; 385/98; 385/99
[58] Field of Search .............. 385/53, 55, 56, 58, 385/60, 62, 66, 70, 75, 76, 77, 78, 81, 84, 95, 97, 98, 99, 136, 137

[56] References Cited

U.S. PATENT DOCUMENTS

| | | | |
|---|---|---|---|
| 4,030,809 | 6/1977 | Onishi et al. | 385/70 |
| 4,684,205 | 8/1987 | Margolin et al. | 385/70 |
| 4,715,876 | 12/1987 | Osaka et al. | 385/96 |
| 4,730,892 | 3/1988 | Anderson et al. | 385/70 |
| 4,964,688 | 10/1990 | Caldwell et al. | 385/56 |
| 5,091,988 | 2/1992 | Degani et al. | 385/70 |
| 5,189,715 | 2/1993 | Eutin et al. | 385/72 |
| 5,195,153 | 3/1993 | Finzel | 385/70 |

*Primary Examiner*—Frank Gonzalez
*Attorney, Agent, or Firm*—R. J. Austin

[57] ABSTRACT

A mechanical splice according to the invention does not use any adhesive for holding the aligned fibers in position. A biasing means is employed for operating upon the gripping and alignment means to align and grip the fibers, by way of a sleeve member. The biasing means is held in a preloaded state by a closure prevention means such that the biasing means cannot act to move the gripping and alignment means into the gripping state. Thus, the mechanical splice is in a preloaded and cocked condition before insertion of the optical fibers to be aligned and mechanically spliced together. Operation of the splice is quick and simple and is performed merely by movement of the closure prevention means out of the cocked position.

8 Claims, 3 Drawing Sheets

OPTICAL FIBER MECHANICAL SPLICE

This invention relates to optical fiber mechanical splices.

Optical fibers are used as a telecommunications transmission medium and for this purpose are included within optical cables having protection means surrounding the fibers. The cables may be for use above-ground, buried underground or within underground ducts.

Under certain circumstances, lengths of optical fibers need to be joined end-to-end in such a manner as to be able to transmit optical signals from length-to-length of the fibers. Such circumstances include where optical fibers are used in optical fiber transmission systems in which optical fiber mechanical splices are used to perform the joining operations. These mechanical splices may be provided in the form of optical fiber mechanical connectors in which an indefinite length of optical fiber is optically connected to a short stub fiber. The connector may then be joined to a mating connector to optically connect one end of the stub fiber and a further optical fiber. For transmission purposes, it has been found to be necessary to provide a polished surface at the end of the stub fiber which is to be connected to the further optical fiber within the other connector. It is difficult and time consuming to polish the stub fiber end to the required surface finish under in situ conditions in which the optical mechanical splices are fitted. Thus, in these conditions, desirable polished end finishes may not be obtained and contaminants may be present which also deleteriously affect the polishing result. It would be advisable therefore if the stub cable ends could be polished under factory conditions. In a prior U.S. Pat. No. 4,964,688 an optical fiber mechanical splice in the form of an optical connector is described in which the construction is such as to enable the use of a stub fiber which has been previously factory polished under controlled conditions. With the use of this connector, there is a problem that while effective in making an optical connection between the stub fiber and an indefinite length of optical fiber, adhesive is required to assemble the indefinite length of fiber and the stub fiber into position. In the field it is advantageous to simplify the assembly process as much as possible and the need to use adhesive detracts from this ideal while potentially rendering the making of the connection a messy operation.

The present invention seeks to provide a mechanical splice which provides mechanical action so as to avoid the above problem and which may be operated quickly to optically connect the optical fibers together.

According to the invention, there is provided an optical fiber mechanical splice comprising:—optical fiber gripping and alignment means comprising a plurality of optical fiber gripping and alignment members extending along a longitudinal axis of the splice, the gripping and alignment means disposed in a condition for insertion therebetween of two optical fibers to be axially aligned and mechanically spliced together; biasing means for closing the gripping and alignment means into a gripping state so as to grip and align the two optical fibers when inserted therebetween; and closure prevention means disposed in a cocked position for holding the biasing means in a preloaded state and for preventing the biasing means from closing the gripping means into the gripping state, the closure prevention means movable out of the cocked position to allow the biasing means to close the gripping means.

The mechanical splice according to the invention does not use any adhesive for holding the aligned fibers in position. Further, a biasing means is employed for operating upon the gripping and alignment means to align and grip the fibers. It is a particularly important feature of the invention that in its state ready for use as featured above, the biasing means is held in a preloaded state such that it cannot act to move the gripping and alignment means into the gripping state. This is effected by the use of the closure prevention means. Thus, the mechanical splice according to the invention is in a preloaded and cocked condition before insertion of the optical fibers to be aligned and mechanically spliced together. The operation of the splice is quick and simple and is performed merely by movement of the closure prevention means out of the cocked position.

Thus, in use, the splice requires no exterior elements for the closure operation to effect fiber alignment. Hence, when working in the field, a splicer merely needs the splice which is in a state ready to perform the splicing operation quickly and easily. In a preferred arrangement, the closure prevention means comprises a removable cocking member which in a cocked position is acted upon directly by the biasing means to prevent it from moving so as to close the gripping and alignment means.

In the preferred arrangement, the splice is a compact construction with the gripping and alignment means surrounded by a rigid member formed with an aperture to enable the biasing means (which is disposed outside the rigid member) to coact with the gripping and alignment means through the aperture for the purpose of closing the gripping means. In a convenient structure, the rigid member is a rigid sleeve extending axially of the gripping and alignment members, the aperture being an axially extending slot in the sleeve with the biasing means extending across the slot to apply an inwards force through the slot to urge the gripping and alignment means into the gripping state. It is also preferred in this compact construction for the biasing means to comprise a longitudinally split sleeve which surrounds the rigid sleeve and extends across the slot so as to operate inwardly on the gripping and alignment means. It is advantageous in splices according to the invention for one of the gripping and alignment members to comprise a tapered groove for acceptance of the optical fibers to be aligned and the other gripping and alignment member has a surface for opposing the groove during closing of the gripping and alignment means so as to urge the two fibers into engagement with the converging surfaces of the groove for alignment purposes.

One embodiment of the invention will now be described, by way of example, with reference to the accompanying drawings, in which.

Figure 1:
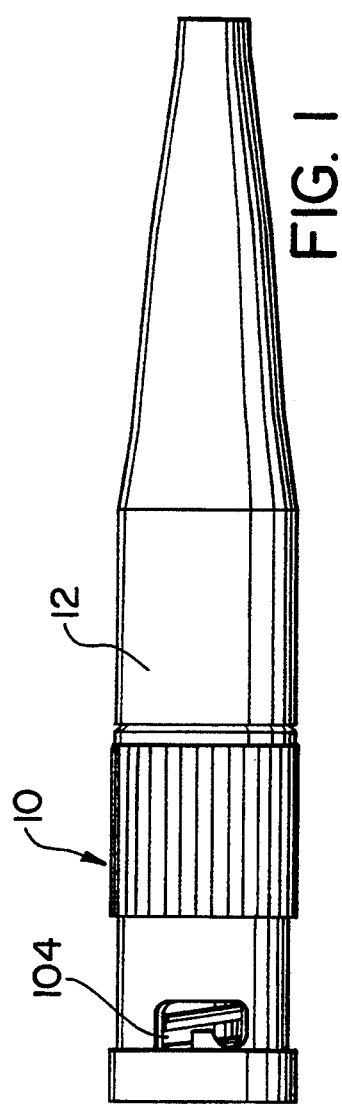
FIG. 1 is a side elevational view of an optical fiber mechanical splice according to the embodiment.
Figure 2:
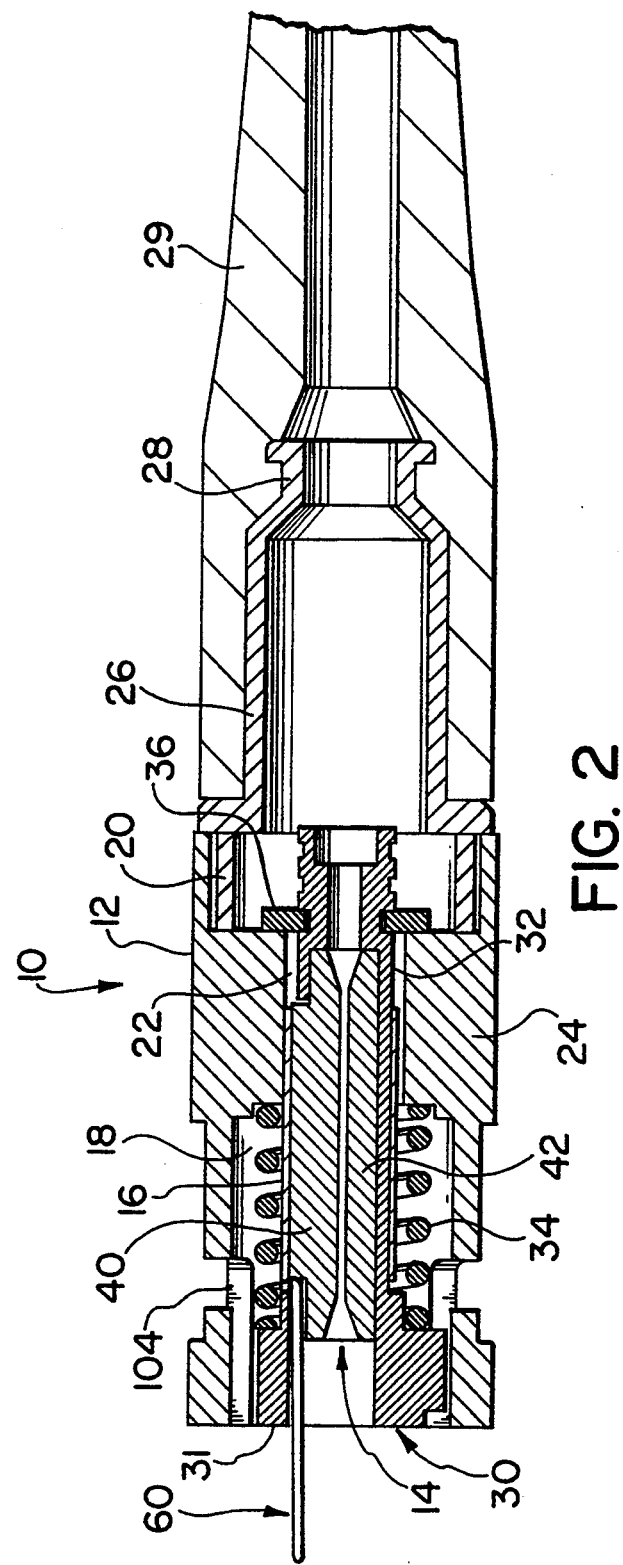
FIG. 2 is a cross-sectional view taken along the longitudinal axis of part of the splice of FIG. 1 and to a larger scale than in FIG. 1.

As shown in FIGS. 1 and 2, an optical fiber mechanical splice 10 comprises a basically cylindrical housing 12 enclosing gripping and alignment means 14 for aligning and optically connecting two optical fibers to be located in the splice, a biasing means 16 for urging the gripping means into a gripping state.

As shown particularly by FIG. 2, the housing 12 has at its left-hand side a cylindrical chamber 18 having an opening at the left-hand or forward end of the housing and a shorter cylindrical opening 20 at the right-hand or rearward end. The two chambers 18 and 20 are interconnected by a smaller diameter chamber region 22 extending between them and which is defined within a thicker wall region 24 of the housing 12. The housing 12 is provided at its rearward end with a removable cover member 26 which is either screw threadably received within the chamber 20 as shown in FIG. 2 or received therein by a spring latch (not shown). A resiliently flexible elastomeric boot 29 shrouds an outwardly extending portion 28 of the cover member 26 and extends further rearwardly for enshrouding a sheath on an optical fiber to be inserted into the splice so as to provide the fiber with support during flexing.

A rigid sleeve member 30 extends through the chamber 18, the smaller diameter region 22 and through the chamber 20 to extend to a position adjacent the end of the housing 12 as shown in FIG. 2. The forward end portion 31 of the sleeve 30 is of large diameter compared to the remainder of the sleeve with the forward end terminating substantially in alignment with the forward end face of the housing 12. Within the chamber 18 and approximately one third of the distance along the chamber 18 the large diameter forward end portion 31 extends into an integral smaller diameter substantially cylindrical portion 32 which extends through the chamber 18, the smaller diameter region 22 and into the chamber 20 as described above. The rigid sleeve member 30 is inserted into the housing 12 and is retained in position therein by inserting it into the forward end of the chamber 18 and into the position shown in FIG. 2. The smaller diameter position 32 of the sleeve 30 within the chamber 18 is surrounded by a compression spring 34 which extends between a surface of the thicker wall region 24 of the housing 12 and a shoulder defined at the rearward end of the forward end portion of the rigid sleeve member. The spring 34 urges the rigid sleeve member in a forward direction so as to cause a resilient locking ring 36 received within a circumferential slot 38 (see FIG. 4) in the small diameter portion 32 within the chamber 20 to be forced against the rearward end of the thicker wall region 24.

Figures 3, 6:
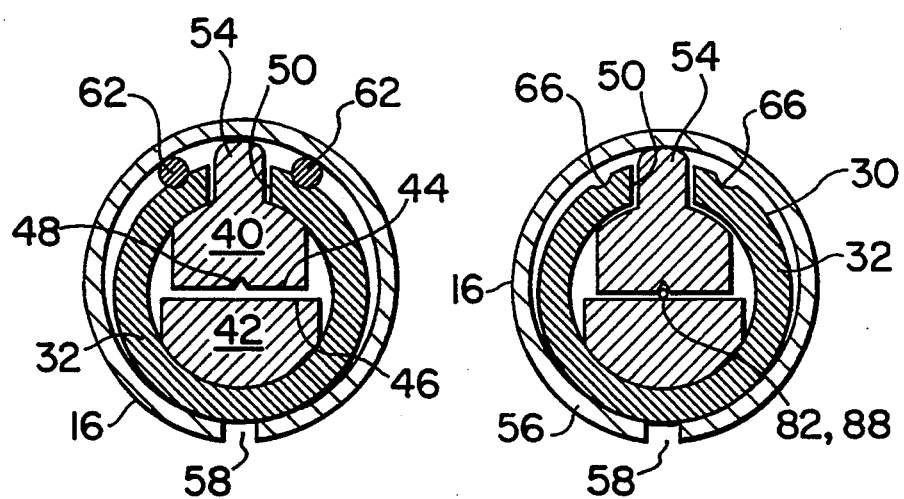
FIG. 3 is a cross-sectional view through the splice taken along line III—III in FIG. 2 and to the scale of FIG. 2.
FIG. 6 is a view similar to FIG. 3 showing features of the splice in the position during use.

The gripping and alignment means 14 comprises, as shown by FIGS. 2 and 3, two radially opposed rigid gripping members 40 and 42. The gripping members 40 and 42 have opposed diametrically extending planar surfaces 44 and 46 respectively, and the surface 44 is formed with a longitudinally extending groove with divergent sides, i.e. a V-shaped groove 48 as shown in FIG. 3. It is intended that the gripping members coact to grip optical fibers of relevant size between them with each fiber received within the groove 48 and urged against the converging surfaces of the groove by the opposing surface 46 thereby causing optical alignment of the fibers in known manner.

The rigid sleeve member 30 is formed with an aperture in the form of an axially extending slot 50 passing through the cylindrical portion 32 (see particularly FIG. 4) with the slot terminating at a forward end close to the larger diameter forward end portion 31 and at a downstream end substantially half-way along the smaller diameter chamber region 22 of the housing 12. As is more readily apparent from FIGS. 3 and 6, the gripping member 40 has an upward extension 54 which extends outwardly of the rigid sleeve member 30 through the slot 50 to extend outwardly beyond the slot for a short distance as shown. Before use, the gripping members 40 and 42 are free to move radially within the confines of the rigid sleeve member 30 with the extension 54 movable freely through the slot 50.

Normally, the gripping members 40 and 42 are freely movable radially within the sleeve member 30. The biasing means 16 operates for closing the gripping and alignment means from their free radial movement state into a gripping state so as to grip and align two optical fibers as will be described. The biasing means 16 is a longitudinally split spring sleeve 16 (see particularly FIGS. 3 and 6) which surrounds the rigid sleeve member 30 while being of substantially larger diameter. The split spring sleeve lies within the confines of the spring 34 and extends axially of the connector so as to overlie substantially the whole of the axial length of the slot 50 and cover the complete axial length of the extension 54. Hence, the split spring sleeve 16 extends from the chamber 18 part way into the smaller diameter chamber region 22. The longitudinal split 58 of the split spring sleeve 16 lies diametrically opposite to the slot 50 so that the spring sleeve extends across the slot and across the extension 54.

Figure 4:
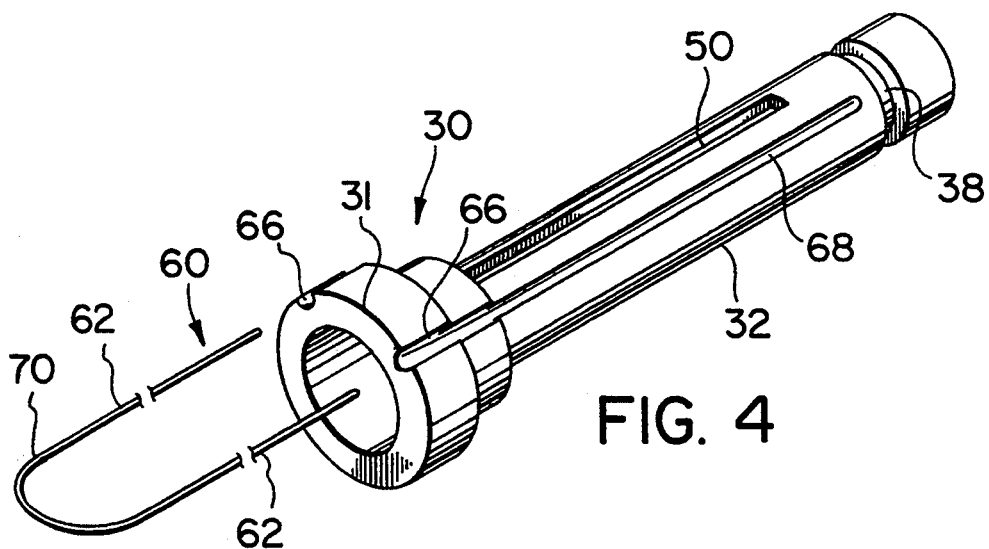
FIG. 4 is an isometric view of an element of the splice to show a detail.

In accordance with a particular feature of this invention, the connector 10 in this embodiment is provided with a closure prevention means which, before use of the connector, is disposed in a cocked position to prevent the biasing means from acting upon the gripping members 40 and 42 thereby preventing the gripping members from being moved into the gripping state. In the embodiment, the closure prevention means comprises a release wire 60 having two elongate release elements in the form of parallel wire end portions 62. As shown by FIGS. 3 and 4, the end portions 62 of the release wire extend through circumferentially spaced grooves 66 extending axially through the forward end portion 31 of the rigid sleeve member 30 and continue along guide recesses 68 formed in the outer surface of the smaller diameter portion 32 of the rigid sleeve member. The release wire 60 has a forward return outer end 70 which connects the parallel end portions 62, the end 70 projecting from the housing 12 so as to be easily gripped for removal purposes of the release wire. As shown by FIG. 3, the two end portions 62 of the release wire are retained within the recesses 68, one on each side of the slot 50, by the radially inward pressure applied by the split spring sleeve 16. In essence, therefore, the end portions 62 retain the split spring sleeve 16 eccentrically mounted around the smaller diameter portion 32 of the rigid sleeve member with the split spring sleeve 16 held away from the rigid sleeve by the end portions 62 so as not to engage the extension 54 of the gripping member 40. It follows therefore from the above description of the embodiment that when supplied for a splicing operation, the connector 10 is assembled completely as shown in FIGS. 1, 2 and 3 with the release wire 60 in position with the end portions 62 received through the two spaced grooves 66 and extending along the recesses 68 to retain the spring 56 outwardly from the rigid sleeve member. In this position the gripping members 40 and 42 are free to move radially and the split spring sleeve 16 is held resiliently outwards, i.e. in a preloaded condition, the release wire 60 thereby being in a cocked position prior to the splicing operation.

Figure 5:
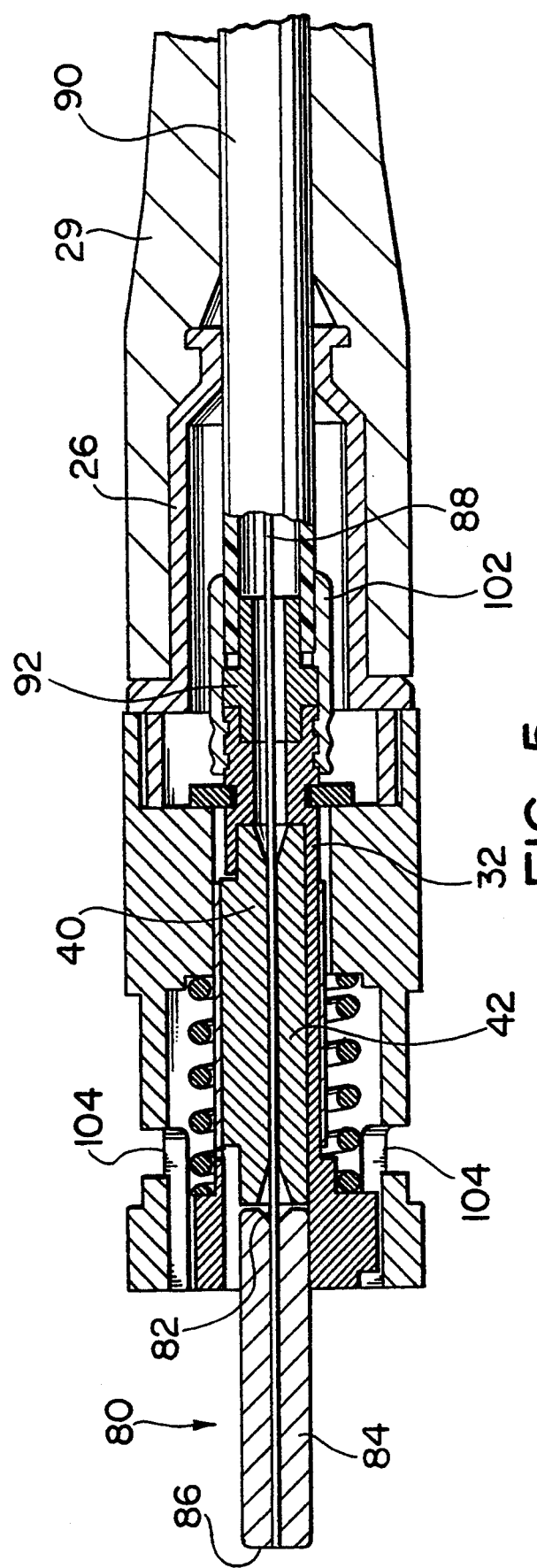
FIG. 5 is a view similar to FIG. 2 and showing the splice in use.

The connector 10 in cocked position is intended for connecting an indefinite length of optical fiber to a short fiber stub which has been pre-polished under factory control conditions to achieve a desired quality of polish. As shown in FIG. 5, the stub fiber 80 comprises a short length 82 of fiber received along a substantial part of the length within a cylindrical ceramic ferrule 84, the fiber length 82 being secured within the ferrule 84 and the forward end 86 of this assembly being pre-polished under factory conditions. The indefinite length 88 of optical fiber is covered by a protective sheath 90 of suitable material as shown by FIG. 5. With the protective material 90 removed for a sufficient distance from the end of the indefinite length 88 of the fiber, the fiber 88 is inserted through the boot 29 and cover member 26 with boot and cover member separated from the housing 12. The length of exposed fiber is such that when inserted through a short sleeve 92 to be disposed within the rearward end of the rigid sleeve member 30 the length 88 projects a required distance between the gripping members 40 and 42. With the use of a suitable index matching material disposed between the fibers 82 and 88, the short stub fiber 80 is inserted into the forward end of the rigid sleeve member 30, the diameter of the rigid sleeve member at its forward end slidably receiving the ceramic ferrule 84 for guidance purposes. In the assembled position, the two fibers 82 and 88 are received within the V-shaped groove 48 and substantially in the position shown in FIG. 6. The gripping members 40 and 42 are radially movable apart in a free manner sufficiently to enable the two fibers to be inserted easily in the axial direction along the groove. When the two fibers are disposed with their ends closely adjacent, the release member 60 is then removed by pulling on the release wire 60 so as to move the end portions 62 of the wire in an axial forward direction of the connector and remove them from the inner position i.e. from within the recesses 68 and grooves 66. Immediately upon removal of the release wire 60, the pre-loaded spring sleeve 66 is allowed to apply its radial inward pressure upon the extension 54 thereby moving more closely against the rigid sleeve member 30 and forcing the gripping members 40 and 42 more closely together and into the gripping state (FIG. 6). As this occurs, the surface 46 applies a radial pressure against the two fibers so as to urge them against the convergent surfaces of the V-shaped groove. This causes axial alignment of the adjacent end portions of the two fibers and this alignment is maintained by the pressure exerted by the surface 46, this pressure being continuous and effected by the action of the inwardly operating spring sleeve 56.

The two fibers are thus spliced together mechanically so as to form an optical connection between the two fibers with the protective sheath 90 of the fiber length 88 extending around the rearward end portion of the sleeve 92, a crimping sleeve 102 which has previously been located around the sheath 90 is then crimped into position around the downstream end of the rigid sleeve member 30 and the end of the sheath surrounding the sleeve 92 to make a secure assembly. The cover member 26 and the boot 29 are then mounted in positions as shown in FIG. 5 to complete the assembly.

The connector 10 is then ready to be assembled to a mating connector (not shown) which is mated to the connector 10 by the use of a bayonet fixing, a bayonet slot 104 for which is shown in FIGS. 1, 2 and 5.

As may be seen from the above description of the embodiment, there is provided a mechanical splice in the form of a mechanical connector which requires no tools or other extraneous equipment to enable the connector to be used for connecting two fibers together. The connector operates simply as a single unit for connection purposes and is caused to operate to provide the optical connection by the use of closure prevention means, i.e. the release wire 60 which, upon withdrawal, acts to permit the automatic closure of the connector and automatic alignment of the fibers. Before use, the connector is maintained by the cocked release wire in a position ready for making the optical connection with the split spring sleeve pre-loaded and ready to force the gripping members into a gripping state. The operation therefore is extremely simple with the operational parts being ready to cause closure of the connector whenever required by simple removal of the release wire. As may be seen, apart from the fact that no extraneous equipment or tools are required, the connector is built for quick connection which is of extreme benefit to a splicer when operating in the field. Because of the use of the release wire 60, after its removal, it cannot be reinserted because the split spring will not allow for reinsertion, and therefore there can be no tampering with the splice after it is in use. The connector, because of its construction, also allows for the use of short fiber lengths which have been pre-polished under desirable factory conditions. All moving parts of the connector lie internally of a housing so as to detract from any contaminants entering into the connector to deleteriously affect the closing and optical connection operation.

What is claimed is:

1. An optical fiber mechanical splice comprising:
   optical fiber gripping and alignment means comprising a plurality of optical fiber gripping and alignment members extending along a longitudinal axis of the splice, the gripping and alignment means disposed in a condition for insertion therebetween of two optical fibers to be axially aligned and mechanically spliced together;
   biasing means for closing the gripping and alignment means into a gripping state so as to grip and align the two optical fibers when inserted therebetween;
   and closure prevention means disposed in a cocked position for holding the biasing means in a pre-loaded state and for preventing the biasing means from closing the gripping and alignment means into the gripping state, the closure prevention means movable out of the cocked position to allow the biasing means to close the gripping and alignment means.

2. A splice according to claim 1 wherein the gripping and alignment means is surrounded by a rigid member formed with an aperture with the biasing means disposed outside the rigid member and with the gripping and alignment means coacting with the biasing means through the aperture for urging the gripping and alignment means into the gripping state.

3. A splice according to claim 1 wherein the rigid member comprises a rigid sleeve extending axially of the gripping and alignment members, the aperture being an axially extending slot in the rigid sleeve with the biasing means extending across the slot to apply an inwards force through the slot to urge the gripping and alignment means into the gripping state, one of the gripping members supported by the rigid member in a radial position opposite the slot and the other gripping member disposed aligned with the slot to be acted upon by the biasing means.

4. A splice according to claim 3 wherein the other gripping member is radially movably received within the slot and the biasing means is a longitudinally split spring sleeve surrounding the rigid sleeve to resiliently urge the gripping and alignment means into the gripping state.

5. A splice according to claim 4 wherein the closure prevention means comprises an elongate release element extending axially of the splice between the rigid and spring sleeves to prevent the spring sleeve acting inwardly of the slot to close the gripping and alignment means into the gripping state, the release element movable axially from between the sleeves to allow the closing means to act upon the gripping and alignment means.

6. A splice according to claim 5 wherein the closure prevention means comprises two elongate release elements disposed in spaced positions circumferentially of the sleeves, one at each side of the slot.

7. A splice according to claim 6 wherein a guide is provided in one of the sleeves for each of the elongate elements.

8. A splice according to claim 7 wherein each guide is formed by a recess defined in the outer surface of the rigid sleeve, and an elongate element lies in its recess and is pressed radially into the recess by the action of the spring sleeve.

* * * * *